US011992712B2

(12) United States Patent
Sun et al.

(10) Patent No.: US 11,992,712 B2
(45) Date of Patent: May 28, 2024

(54) POLARIZED DECELERATION BRAKE FOR SELF RETRACTING DEVICE

(71) Applicant: HONEYWELL INTERNATIONAL INC., Morris Plains, NJ (US)

(72) Inventors: Anbo Sun, Shanghai (CN); Frank Lin, Shanghai (CN); Peng Zhou, Shanghai (CN); Xiaojuan Zhu, Shanghai (CN); Tingjun Zhou, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 843 days.

(21) Appl. No.: 17/048,011

(22) PCT Filed: Apr. 19, 2018

(86) PCT No.: PCT/CN2018/083744
§ 371 (c)(1),
(2) Date: Oct. 15, 2020

(87) PCT Pub. No.: WO2019/200587
PCT Pub. Date: Oct. 24, 2019

(65) Prior Publication Data

US 2021/0170208 A1 Jun. 10, 2021

(51) Int. Cl.
*A62B 35/00* (2006.01)
*A62B 35/04* (2006.01)

(52) U.S. Cl.
CPC .......... *A62B 35/0093* (2013.01); *A62B 35/04* (2013.01)

(58) Field of Classification Search
CPC ........ A62B 35/0093; A62B 35/04; A62B 1/10
See application file for complete search history.

(56) References Cited

U.S. PATENT DOCUMENTS 9,861,841 B1 1/2018 Hung
2013/0299275 A1 11/2013 Westermann et al.
(Continued)

FOREIGN PATENT DOCUMENTS

CH 335407 A 12/1958
CN 101314386 A 12/2008
(Continued)

OTHER PUBLICATIONS

WO2005025678A1 Wolner translation (Year: 2005).*
(Continued)

*Primary Examiner* — Brian D Mattei
*Assistant Examiner* — Jacob G Sweeney
(74) *Attorney, Agent, or Firm* — Alston & Bird LLP

(57) ABSTRACT

An apparatus and an associated method relates to a directionally polarized deceleration module (PDM) include a shuttle (125) fixedly coupled to a spring-biased spool (120) rotatable coupled to a module housing (115), a dynamic braking member (DBM) (130) and the shuttle (125) configured to travel inside a channel anchored to the module housing (115). A tether may be anchored on a proximal end to the spool (120). As the tether is retracted, the DBM (130) may be pushed by an angled distal-end of the shuttle (125). The DBM (130) may be forced between the angled distal-end of the shuttle (125) and an inner channel wall, providing motional resistance to the tether. As the tether is extracted, the DBM (130) may be pushed substantially normal to a proximal-end of the shuttle (125), providing minimal motional resistance to the tether. Various PDMs may decelerate safety lanyards in one direction to substantially avoid tangling and/or damage.

20 Claims, 11 Drawing Sheets

(56) References Cited

U.S. PATENT DOCUMENTS

| | | | |
|---|---|---|---|
| 2016/0114199 | A1 | 4/2016 | Bogardus, Jr. |
| 2018/0028844 | A1 | 2/2018 | Wu |

FOREIGN PATENT DOCUMENTS

| | | | | | |
|---|---|---|---|---|---|
| CN | 202036709 | U | | 11/2011 | |
| CN | 202497623 | U | | 10/2012 | |
| CN | 105987157 | A | | 10/2016 | |
| CN | 205740122 | U | * | 11/2016 | ............... B66D 1/28 |
| CN | 205740122 | U | | 11/2016 | |
| CN | 106390321 | A | | 2/2017 | |
| CN | 206910618 | U | | 1/2018 | |
| CN | 109132727 | A | | 1/2019 | |
| JP | 2006280739 | A | | 10/2006 | |
| WO | WO-2005025678 | A1 | * | 3/2005 | ............... A62B 1/10 |

OTHER PUBLICATIONS

CN205740122U Chen translation (Year: 2016).*
Office Action issued in Chinese Application No. 201880091700.2 dated Mar. 23, 2021, 14 pages.
Decision to grant a European patent dated Jun. 29, 2023 for EP Application No. 18915372, 2 page(s).
Intention to grant dated Mar. 1, 2023 for EP Application No. 18915372.
European Search Report and Search Opinion received for EP Application No. 18915372.9, dated Nov. 11, 2021, 7 pages.
Notification to Grant Patent Right issued in Chinese Application No. 201880091700.2 dated Oct. 29, 2021, 7 pages.

* cited by examiner

POLARIZED DECELERATION BRAKE FOR SELF RETRACTING DEVICE

TECHNICAL FIELD

Various embodiments relate generally to personal protective equipment (PPEs) and more specifically to safety lanyards and self-retracting devices (SRDs).

BACKGROUND

Worldwide, individuals make a living performing in a myriad of jobs. Many jobs include various hazards from minor cuts and abrasions to more serious hazards such as loss of life. In some examples, highway construction workers may be exposed to adjacent flows of automobile traffic. Welders may be exposed to intense light that may cause eye damage. Construction workers may be exposed to falling objects. In some examples, trash and recycling collectors may be exposed to abrasive, sharp or corrosive waste.

Personal protection equipment (PPEs) may be worn by workers in hazardous environments. PPEs may protect workers from the harmful effects of various hazards. For example, highway construction workers may wear brightly colored vests to become highly visible to motorists. Welders may strap on a face-shield with protective light filtering lenses to filter out the effects of damaging light from welding arcs. In the construction industry, workers may wear various headgear, such as hardhats, to protect against falling objects. Construction workers on scaffolding or roofs may be tethered to safety lanyards to prevent or to minimize the effects of an accidental fall. In some instances, the lanyards may be implemented in various types of self-retracting devices (SRDs).

SUMMARY

Apparatus and associated methods relate to a directionally polarized deceleration module (PDM) including a shuttle fixedly coupled to a spring-biased spool rotatably coupled to a module housing, a dynamic braking member (DBM) and the shuttle configured to travel inside a channel anchored to the module housing. In an illustrative example, a tether may be anchored on a proximal end to the spool. In some examples, as the tether is retracted, the DBM may be pushed by an angled distal-end of the shuttle. The DBM may be forced between the angled distal-end of the shuttle and an inner channel wall, for example, providing motional resistance to the tether. In some examples, as the tether is extracted, the DBM may be pushed substantially normal to a proximal-end of the shuttle, providing minimal motional resistance to the tether. Various PDMs may decelerate safety lanyards in one direction to substantially avoid tangling and/or damage.

Various embodiments may achieve one or more advantages. For example, some embodiments may substantially avoid or eliminate tangling of lanyards within various self-retracting devices (SRDs). Some embodiments may substantially avoid or eliminate damage to SRDs due to impacts of distal ends of lanyards colliding with SRD enclosures. Some examples of a PDM implemented on an SRD may substantially avoid or eliminate whiplash of an SRD cord as it is retracted into the SRD. Various embodiments may provide a polarized deceleration, slowing the longitudinal motion of a lanyard in a retraction direction only.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case depicting a polarized deceleration module (PDM) is briefly introduced with reference to FIG. 1. Second, with reference to FIGS. 2A and 2B, the discussion turns to exemplary embodiments that illustrate the operation of PDMs. Specifically, FIG. 2A illustrates resistive movement in a retraction mode, and FIG. 2B illustrates free movement in an extraction mode. Next, with reference to FIGS. 3A and 3B, exemplary PDMs are presented applied to self-retraction devices (SRDs). Next, with reference to FIG. 4 and FIG. 5, the discussion turns to exemplary frictional locations. Next, FIGS. 6A-6F present various exemplary surface shapes implemented on various exemplary shuttles. Next, FIGS. 7A-7F present exemplary dynamic braking members (DBMs) with various shapes. Next, with reference to FIGS. 8A and 8B, further discussion of exemplary extraction ends of a shuttle are presented to explain frictional reduction techniques. Finally, with reference to FIG. 9, an exemplary embodiment that produces frictional engagement with both inner and outer walls of a shuttle track is presented.

Figure 1:
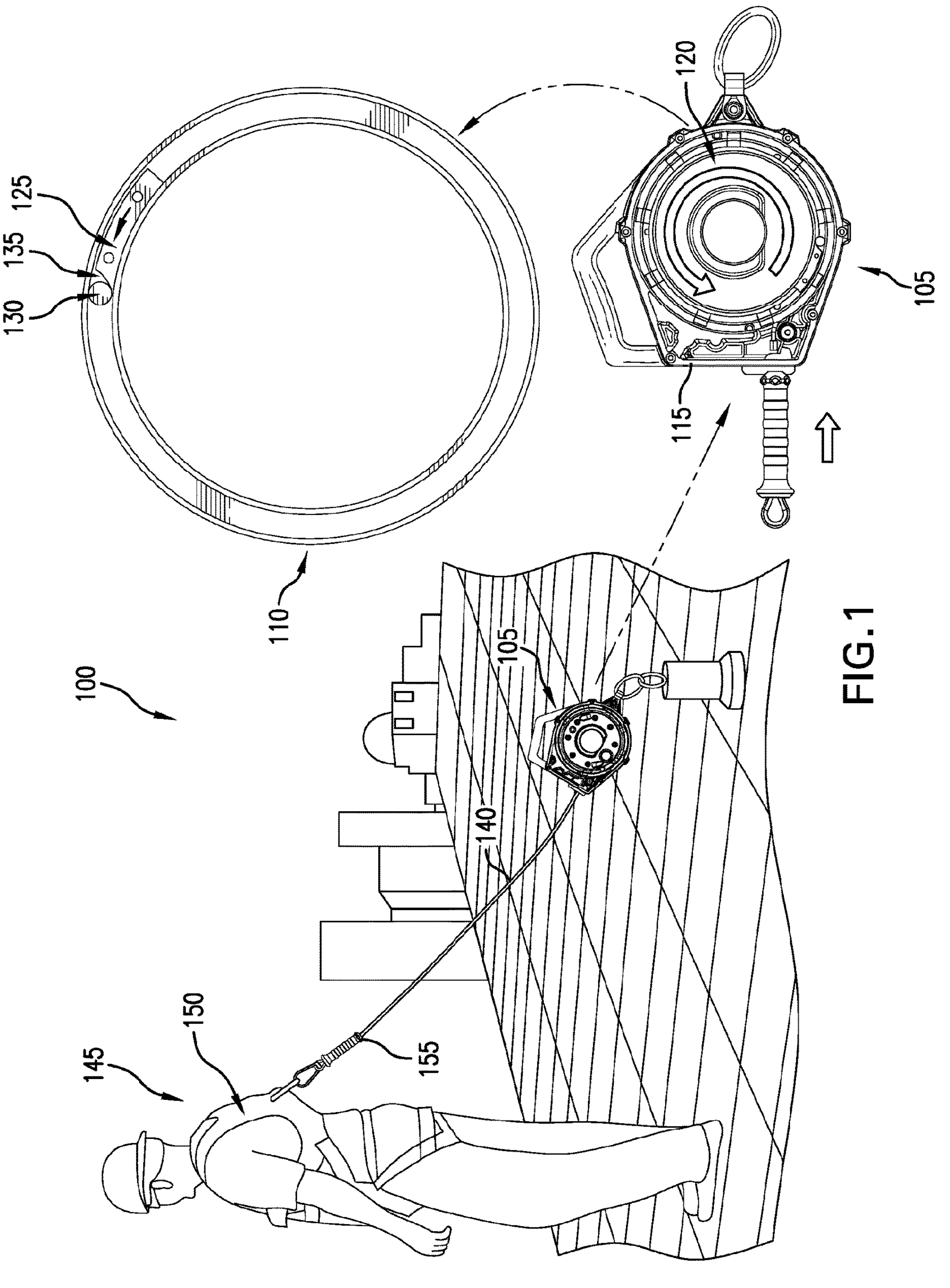
FIG. 1 depicts an exemplary self-retracting device (SRD) providing fall protection to a construction worker on a roof, the SRD providing control of a lanyard filament speed.
Figure 2A:
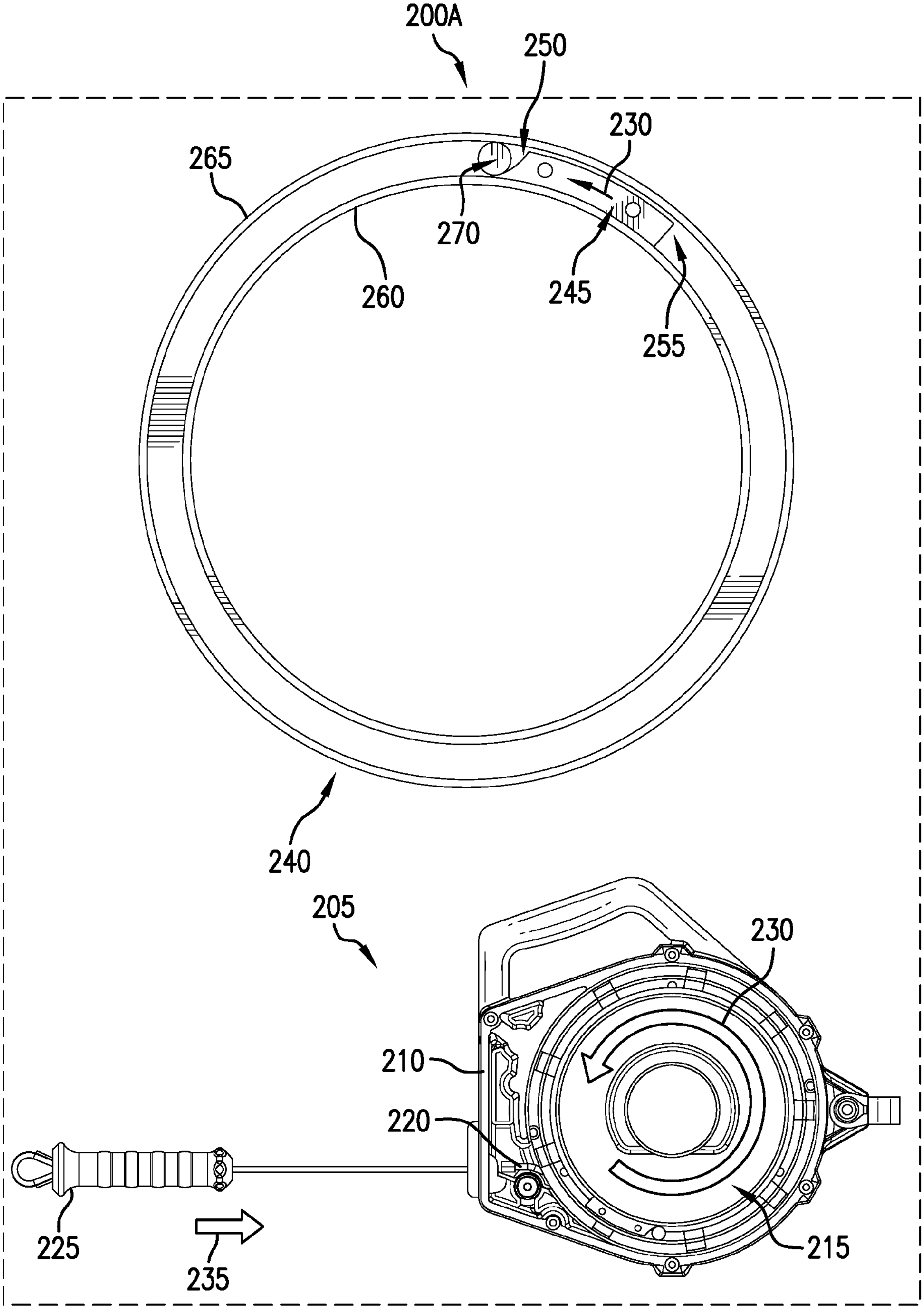
FIG. 2A depicts a plan view of an exemplary SRD in a tether retraction mode, being decelerated by a brake pad puck in an impinging frictional engagement between a ram-trolley and a track wall.
Figure 2B:
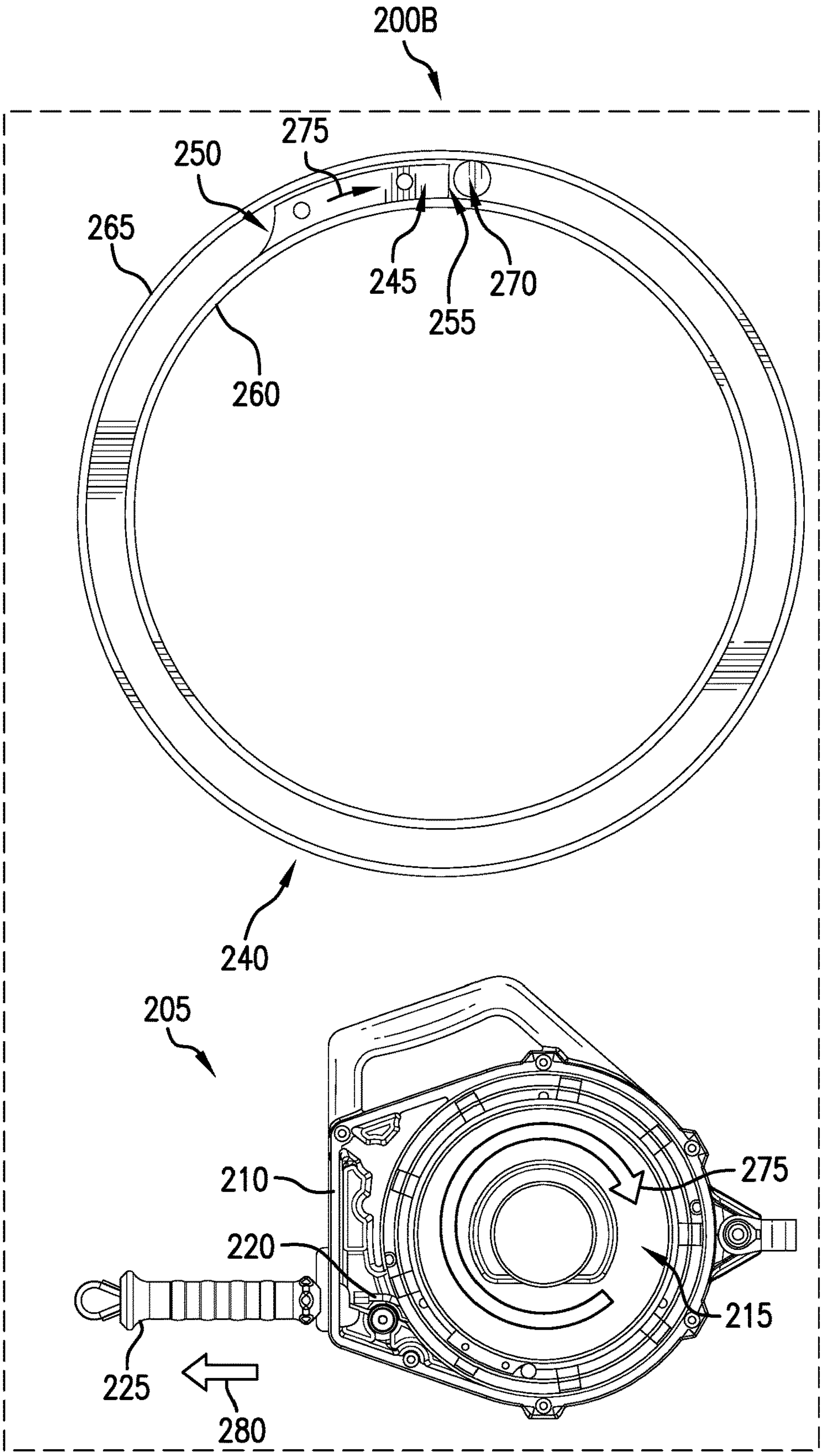
FIG. 2B depicts a plan view of an exemplary SRD in a tether extraction mode, being decelerated by a brake pad puck in minimal frictional engagement between a ram-trolley and a track wall.

FIG. 1 depicts an exemplary self-retracting device (SRD) providing fall protection to a construction worker on a roof, the SRD providing control of a lanyard filament retraction speed. An SRD safety deployment scenario 100 includes an SRD 105. The SRD 105 includes a channel ring 110 fixedly coupled to an SRD housing 115. A rotating drum 120 is rotatably coupled to the SRD housing 115. A shuttle 125 is fixedly coupled to the rotating drum 120. The shuttle 125 moves within the channel ring 110. A dynamic braking member (DBM) 130 is advanced by the shuttle 125 within the channel ring 110. The shuttle 125 includes an inclined surface 135. As the DBM 130 is advanced by the inclined surface 135 of the shuttle 125, the DBM 130 is forced into an impinging frictional engagement between an inner surface of an outer wall of the channel ring 110 and the shuttle 125. The impinging frictional engagement may advantageously slow the retraction speed of a lanyard filament. In various examples, slowing the retraction speed may advantageously mitigate tangling of various lanyard filaments, and may mitigate damage to various SRD housings. The inclined surface 135 may guide the DBM 130 into a frictional retraction impingement with an inside surface of a circular channel, such as the channel ring 110, when a cylindrical drum, such as rotating drum 120, is in a retraction mode.

A lanyard filament 140 is mechanically coupled on one end to the rotating drum 120. The SRD 105 is configured to manage the lanyard filament 140 by spooling the lanyard filament 140 onto the rotating drum 120 in the retraction mode and by unspooling the lanyard filament 140 off from the rotating drum 120 in an extraction mode. In an illustrative example, the rotating drum 120 is spring biased to reel in any length of lanyard filament 140 that may be extracted from the SRD 105. In the depicted example, a worker 145 is coupled to the lanyard filament 140. The lanyard filament 140 is held taut since the rotating drum 120 is spring biased in a retraction direction.

In an illustrative example, when the worker 145 completes his tasks on the roof, he releases the lanyard filament 140 from a safety vest 150. The worker 145 releases the lanyard filament 140 without restraint. As the lanyard filament 140 self-retracts into the SRD 105, the shuttle 125 begins to travel around the channel ring 110 in response to rotation of the spring biased rotating drum 120. Since the lanyard filament 140 is unrestrained, the spring biased rotating drum 120 and the shuttle 125 may freely rotate in a retraction direction. The shuttle 125 comes in contact with the DBM 130 at a point in its travel around the channel ring 110. Due to the inclined surface 135 of the shuttle 125, the DBM 130 is forced into an impinging frictional engagement between an inner surface of an outer wall of the channel ring 110 and the shuttle 125. The impinging frictional engagement opposes the movement of the shuttle 125 within the channel ring 110. The movement of the shuttle 125 slows down in response to the impinging frictional engagement. The shuttle 125 slows the rotating drum 120, which slows the retraction speed of the lanyard filament 140. Slower speeds of the lanyard filament 140 may advantageously reduce tangling of the lanyard filament 140 within the rotating drum 120.

The lanyard filament 140 is fixedly coupled to a filament termination 155 on a distal end. Slower speeds of the lanyard filament 140 may advantageously mitigate damaging impacts of the filament termination 155 against the SRD housing 115.

In various exemplary deployments, the SRD 105 may be mechanically coupled overhead. For example, the SRD 105 may be coupled to a rotational boom anchor. The rotational boom anchor may advantageously provide the user a larger protected work area than the SRD 105 alone. In some examples, the SRD 105 may be mechanically coupled overhead to various scaffolding or may be mechanically coupled to various extending members of a crane.

FIG. 2A depicts a plan view of an exemplary SRD in a tether retraction mode, being decelerated by a brake pad puck in an impinging frictional engagement between a ram-trolley and a track wall. An SRD 205 in a retraction mode 200A includes an enclosure 210. The enclosure 210 is rotatably coupled to a take-up reel 215. The take-up reel 215 is fixedly coupled to a proximal end of a tether 220. In the depicted example, the tether 220 is wound around the take-up reel 215. A tether termination handle 225 is fixedly coupled to a distal end of the tether 220. The take-up reel 215 is spring biased in a retraction direction. In the depicted example, the take-up reel 215 is rotating in a counterclockwise direction 230 illustrating the tether 220 being actively retracted 235.

The enclosure 210 is fixedly coupled to a circular track 240. The circular track 240 is in confined engagement with a ram-trolley 245. The ram-trolley 245 is fixedly coupled to the take-up reel 215. The ram-trolley 245 is configured with a ramp surface at a retraction end 250, and with a surface parallel to a radius of the circular track 240 at an extraction end 255. The circular track 240 includes an inner wall 260 and an outer wall 265. The inner wall 260 and the outer wall 265 constrain a brake pad puck 270. The brake pad puck 270 is free to move between the confines of the inner wall 260 and the outer wall 265.

In operation, as the tether 220 is retracted into the SRD 205, the ram-trolley 245, being coupled to the take-up reel 215, travels in a retraction direction (e.g., the counterclockwise direction 230 with reference to FIG. 2A). The ramp surface at the retraction end 250 of the ram-trolley 245 moves the brake pad puck 270 toward the outer wall 265. The motion of the ram-trolley 245 in combination with the ramp surface forces the brake pad puck 270 into a frictional engagement between the ram-trolley 245 and the outer wall 265. In some examples, the ramp surface may be inverted from the depicted example, forcing the brake pad puck 270 into a frictional engagement between the ram-trolley 245 and the inner wall 260. The retraction end 250 may guide a DBM, such as brake pad puck 270, into a frictional retraction impingement with an inside surface of a circular channel, such as the outer wall 265 of the circular track 240, when a cylindrical drum, such as the take-up reel 215, is in the retraction mode.

FIG. 2B depicts a plan view of an exemplary SRD in a tether extraction mode, being decelerated by a brake pad puck in minimal frictional engagement between a ram-trolley and a track wall. In the depicted example, an SRD 205 is in an extraction mode 200B. The take-up reel 215 is rotating in a clockwise direction 275 illustrating the tether 220 being actively extracted 280.

In operation, as the tether 220 is extracted out of the SRD 205, the ram-trolley 245, being coupled to the take-up reel 215, travels in an extraction direction (e.g., a clockwise direction 275 with reference to FIG. 2B). The surface parallel to a radius of the circular track 240 at an extraction end 255 of the ram-trolley 245 moves the brake pad puck 270 along the circular track 240 without impingement. The take-up reel 215 is free to move in the extraction direction without the braking force present in the retraction direction. Various SRD embodiments may advantageously provide a directionally polarized deceleration force, provide substantially free lanyard extraction and provide an advantageous deceleration during retraction.

Figure 3A:
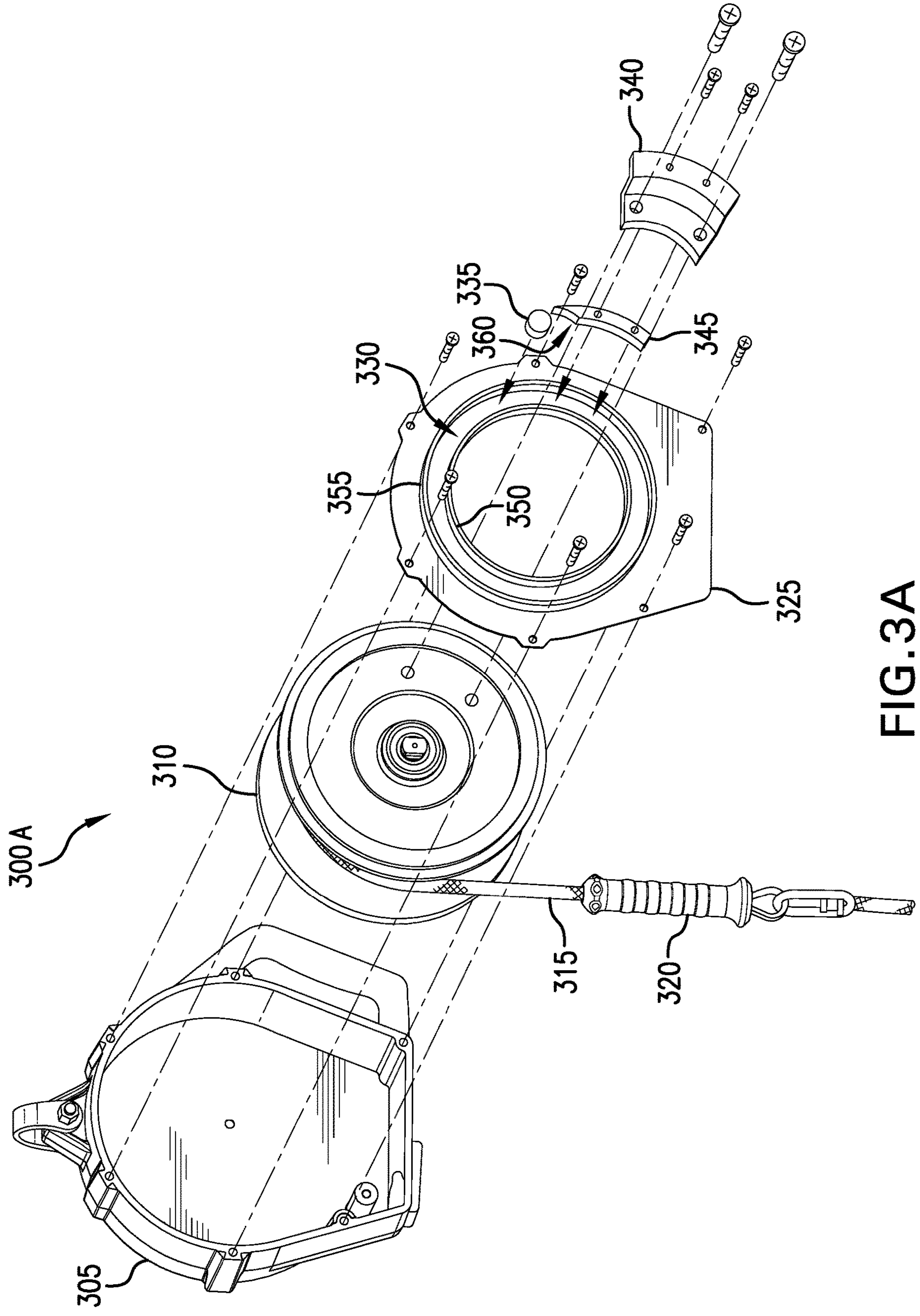
FIG. 3A depicts a perspective exploded view of an exemplary SRD, illustrating a shuttle coupled to a spring-biased drum.

FIG. 3A depicts a perspective exploded view of an exemplary SRD, illustrating a shuttle coupled to a spring-biased drum. An SRD 300A includes a rear enclosure 305. The rear enclosure 305 is rotatably coupled to a drum 310. The drum 310 is fixedly coupled to a tether 315 on a proximal end. The tether 315 is fixedly coupled to a handle 320 on a distal end. The drum 310 is captured between the rear enclosure 305 and a front enclosure 325. A circular track 330 is fixedly coupled to the front enclosure 325. A dynamic braking member (DBM) 335 is captured within a recessed channel of the circular track 330. A shuttle bracket 340 is fixedly coupled to the drum 310. The shuttle bracket 340 is fixedly coupled to a shuttle 345. The shuttle 345 is confined within the recessed channel of the circular track 330.

In operation, the DBM 335 is free to move within the recessed channel of the circular track 330. The shuttle 345 moves within the recessed channel the circular track 330 in response to the rotation of the drum 310. Accordingly, as the drum 310 rotates, the shuttle 345 may push the DBM 335 through the recessed channel of the circular track 330.

The circular track 330 includes an inner wall 350 and an outer wall 355. The shuttle 345 is configured on an inclined end 360 to force the DBM 335 into an inner track surface of the inner wall 350. The inclined end 360 is configured to bind the DBM 335 between the inner track surface of the inner wall 350 and the inclined end 360. The inclined end 360 may guide the DBM 335 into a frictional retraction impingement with an inside surface of a circular channel, such as the circular track 330, when a cylindrical drum, such as the drum 310, is in a retraction mode.

The binding action may provide an opposing force to the movement of the shuttle 345. The opposing force may slow the rotational speed of the drum 310. The slower rotational speed of the drum 310 may slow the retraction of the tether 315. Slower retraction speeds of the tether 315 may advantageously reduce damaging impacts of the handle 320 colliding with the rear enclosure 305 and/or the front enclosure 325. The shuttle 345 is configured on a second end to move the DBM 335 between, and parallel to, the inner wall 350 and the outer wall 355 without binding.

Figure 3B:
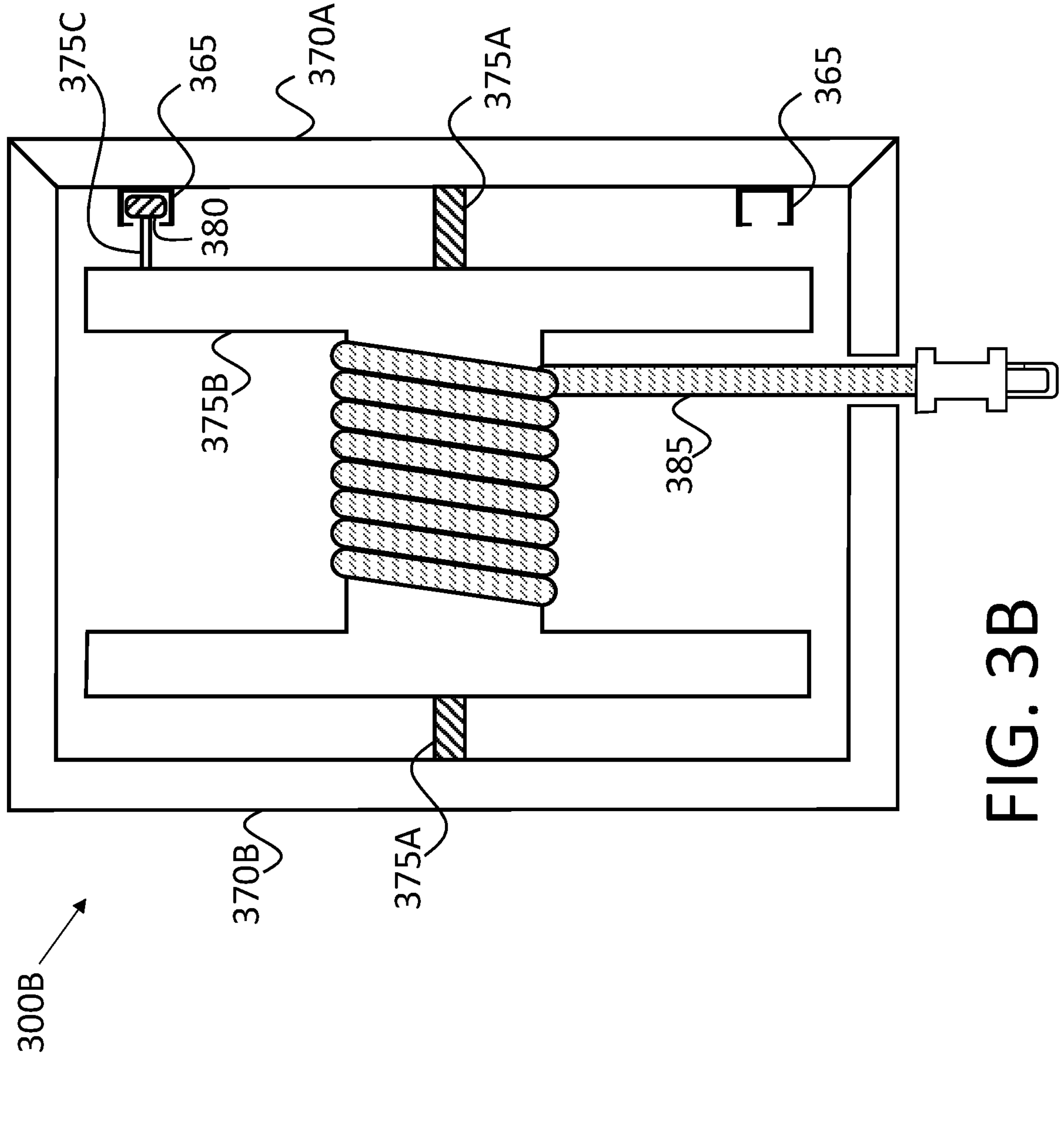
FIG. 3B depicts a cross-sectional view of an exemplary SRD, illustrating a shuttle coupled to a spring-biased drum.

FIG. 3B depicts a cross-sectional view of an exemplary SRD, illustrating a shuttle coupled to a spring-biased drum. In the depicted example, an SRD 300B includes a track 365. The track 365 is fixedly coupled to the inside of a housing cover 370A. The housing cover 370A is fixedly coupled to a housing back-shell 370B. The housing cover 370A and the housing back-shell 370B are rotatably coupled to an axle 375A. The axle 375A is rotatably coupled to a drum 375B. The drum 375B is fixedly coupled to a shuttle bracket 375C. The shuttle bracket 375C is coupled to a shuttle 380. The shuttle 380 is housed in, and moves within, the confines of the track 365 in response to the rotation of the drum 375B. As the drum 375B rotates, a filament 385 is reeled or unreeled from the drum 375B.

Figure 4:
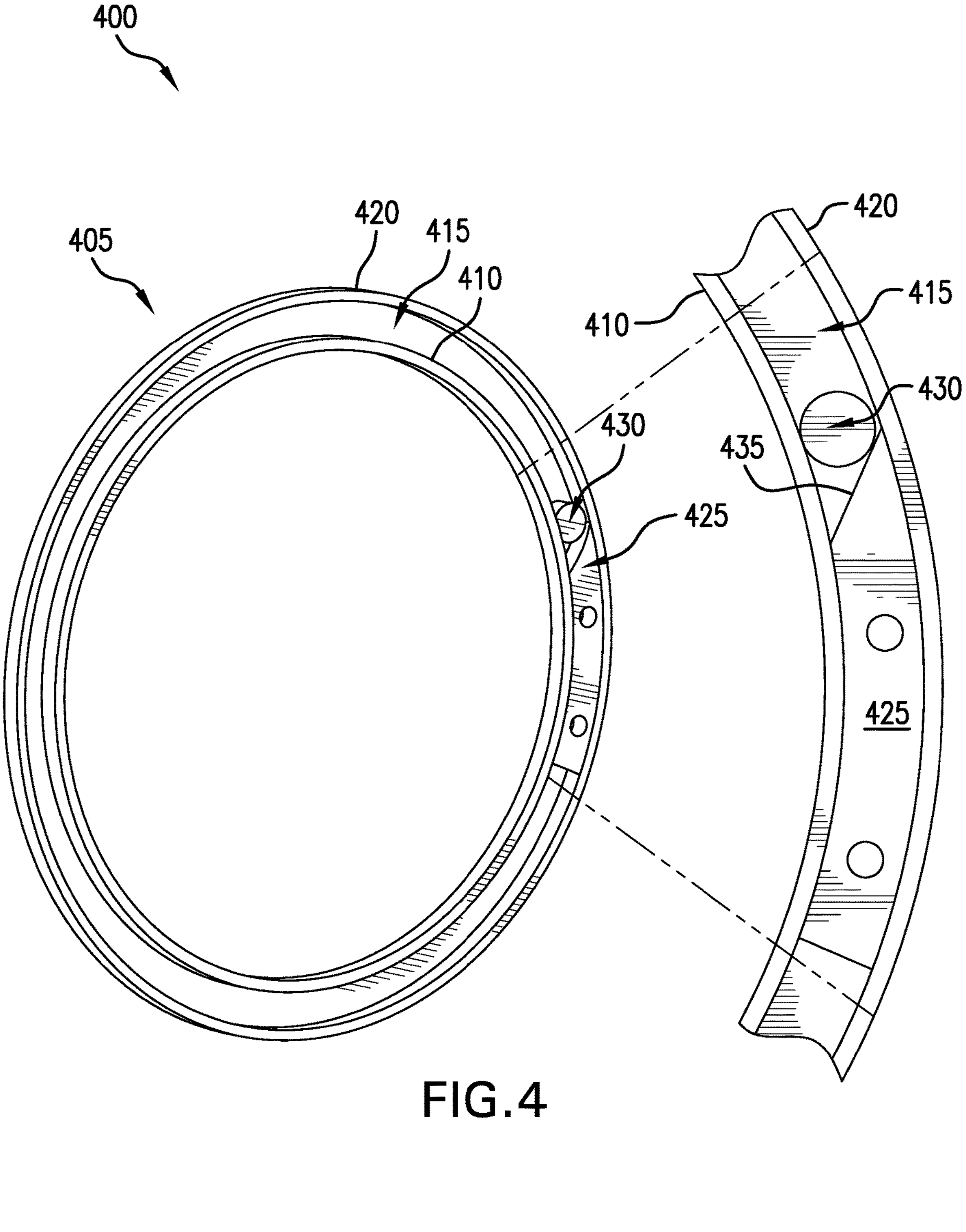
FIG. 4 depicts a perspective view of an exemplary shuttle and brake disk located and guided by a channel ring, the brake disk frictionally engaged with an inner wall of the channel ring.

FIG. 4 depicts a perspective view of an exemplary shuttle and brake disk located and guided by a channel ring, the brake disk frictionally engaged with an inner wall of the channel ring. An inner wall brake configuration 400 includes a channel ring 405. The channel ring 405 is unitary and formed of an inner wall 410, a floor 415 and an outer wall 420. A shuttle 425 is captured between and guided by the inner wall 410, the floor 415 and the outer wall 420. A brake disk 430 is captured between and guided by the inner wall 410, the floor 415 and the outer wall 420. The shuttle 425 includes an inclined plane surface 435. In the depicted example, when the shuttle 425 moves counterclockwise, the brake disk 430 is forced toward the inner wall 410 by the inclined plane surface 435. In various examples, the brake disk 430 may be in frictional engagement with the shuttle 425 and the inner wall 410. The inclined plane surface 435 may guide a DBM, such as the brake disk 430, into a frictional retraction impingement with an inside surface of a circular channel, such as the channel ring 405, when a cylindrical drum is in a retraction mode.

Figure 5:
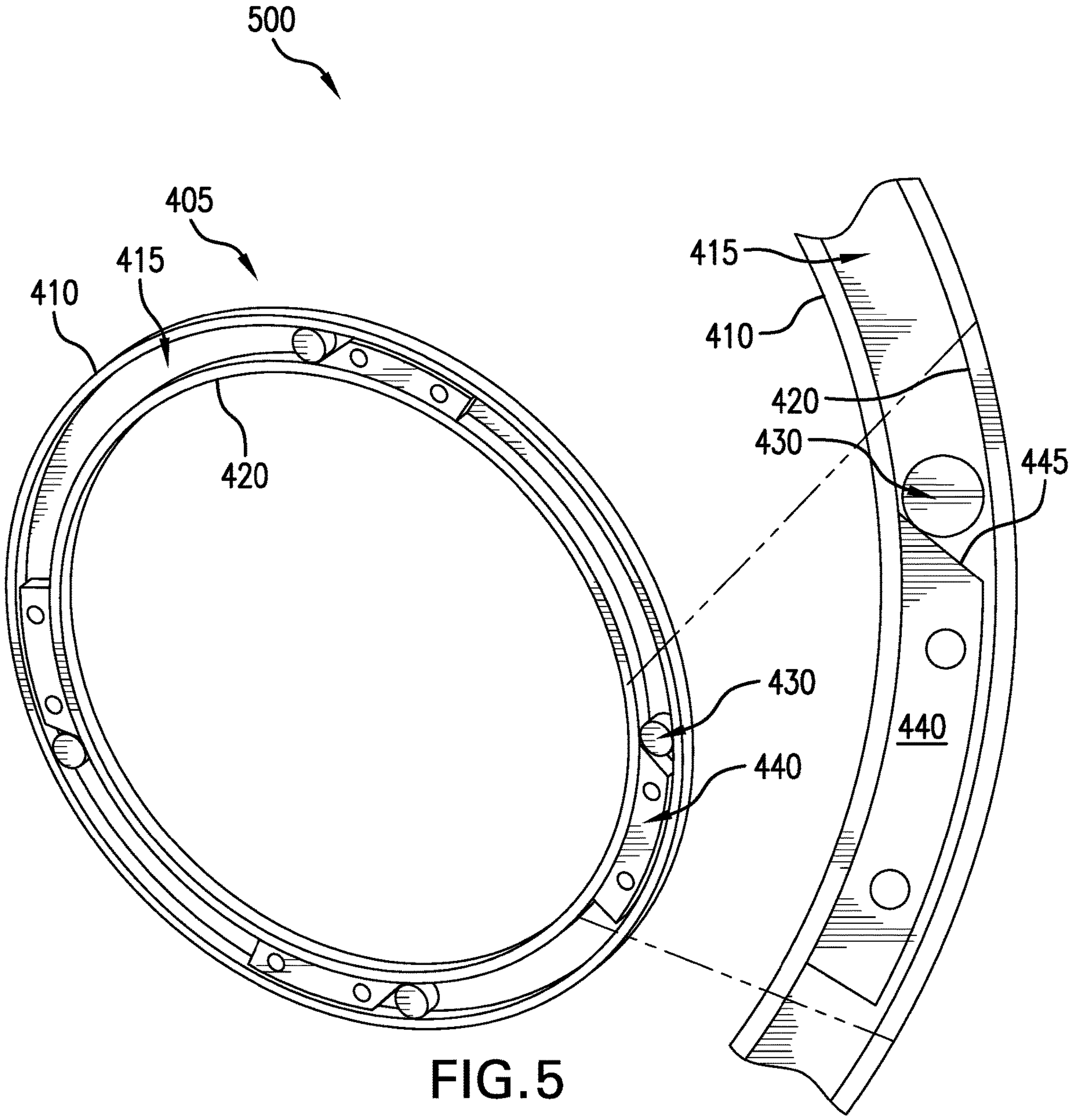
FIG. 5 depicts a perspective view of an exemplary shuttle and brake disk located and guided by a channel ring, the brake disk frictionally engaged with an outer wall of the channel ring.

FIG. 5 depicts a perspective view of an exemplary shuttle and brake disk located and guided by a channel ring, the brake disk frictionally engaged with an outer wall of the channel ring. A shuttle 440 includes an inclined plane surface 445. In the depicted example, when the shuttle 440 moves counterclockwise, the brake disk 430 is forced toward the outer wall 420 by the inclined plane surface 445. In various examples, the brake disk 430 may be in frictional engagement with the shuttle 440 and the outer wall 420. The inclined plane surface 445 may guide a DBM, such as brake disk 430, into a frictional retraction impingement with an inside surface of a circular channel, such as the channel ring 405, when a cylindrical drum is in a retraction mode.

As depicted in FIG. 5 the shuttle 440 bake disk 430 may be replicated and distributed about the channel ring 405. In each instance the shuttles 440 may be mechanically coupled to a rotating drum, such as the rotating drum 310 (FIG. 3A). Multiple instances of the shuttle 440 along with multiple instances of the brake disk 430 may advantageously increase a braking force. In some examples, multiple instances of the shuttle 440 along with multiple instances of the brake disk 430 may advantageously provide design redundancy.

FIGS. 6A, 6B, 6C, 6D, and 6E depict plan views of various shuttle embodiments. Each embodiment includes a distal surface on a retracting end and a proximal surface on an extending end. The retracting end is the leading edge during a lanyard retraction process (e.g., FIG. 2A). The extending end is the leading edge during an extension process (e.g., FIG. 2B).

In some embodiments, the distal surface may be linear, for example, incorporating a linear ramp or wedge. In some implementations, the distal surface may be, for example, hyperbolic or reverse hyperbolic, implementing a scooped or reverse scoop shape.

Figures 6A, 6B, 6C, 6D, 6E, 6F:
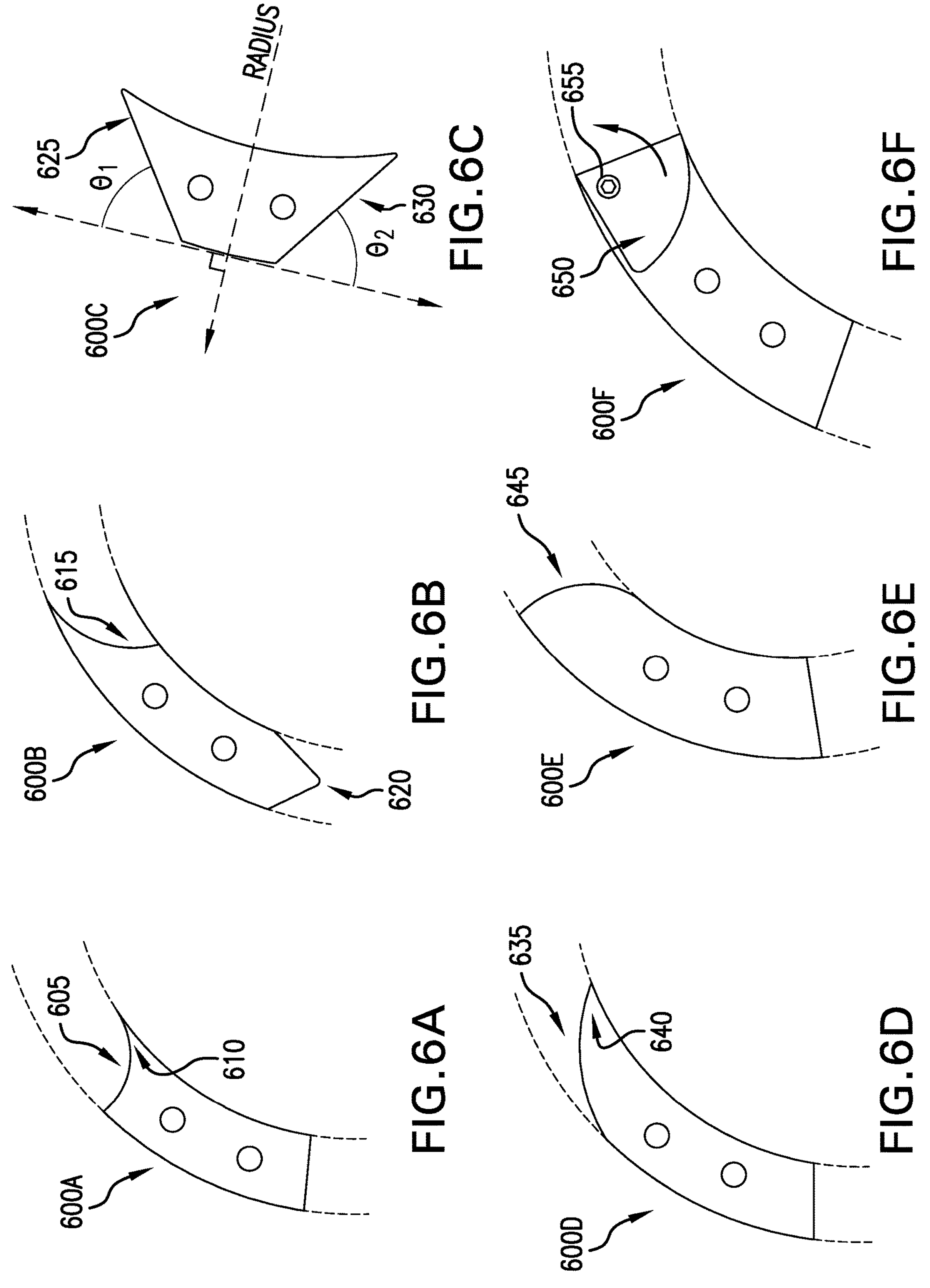
FIGS. 6A, 6B, 6C, 6D, 6E and 6F depict plan views of exemplary shuttle embodiments.

FIG. 6A depicts a shuttle component 600A including an outward facing concave incline feature 605 on a distal surface. The outward facing concave incline feature 605 may include an incipient angle 610 forming a leading point. The incipient angle 610 may generate an impinging force against a dynamic braking member, providing a braking function. The outward facing nature of the outward facing concave incline feature 605 may force the dynamic braking member toward an outer wall of a raceway, which may advantageously increase braking force.

FIG. 6B depicts a shuttle component 600B including an inward facing concave incline feature 615 on a distal surface and a triangular point feature 620 on a proximal surface. The inward facing nature of the inward facing concave incline feature 615 may force a dynamic braking member toward an inner wall of a raceway, which may decrease force, advantageously decreasing the sensitivity of an angle on the inward facing concave incline feature 615 contacting the dynamic braking member. Decreasing sensitivity may loosen manufacturing tolerances of the part. The triangular point feature 620 on the proximal surface may further minimize friction between the dynamic braking member and the shuttle component 600B, in an extraction mode. The friction may be minimized by minimizing the contact area between the triangular point feature 620 and the dynamic braking member.

FIG. 6C depicts a shuttle component 600C with a first incline feature 625 on a distal surface and a second incline feature 630 on a proximal surface. The first incline feature 625 may be configured to slow the retraction speed, and the second incline feature 630 may be configured to slow the extraction speed. Slowing the extraction speed may advantageously slow down a rapid fall of a tethered individual. Accordingly, various SRDs may be simultaneously customized for limiting maximum retraction and extraction speeds.

FIG. 6D a shuttle component 600D including an outward facing convex incline feature 635 on a distal surface. The outward facing convex incline feature 635 may include an incipient angle 640 forming a blunt leading end. The incipient angle 640 may substantially reduce or minimize frictional engagement against a dynamic braking member, providing a substantially reduced or minimized braking force. The minimal braking force may reduce wear on the dynamic braking member, which may advantageously increase a working life of the dynamic braking member. The outward facing nature of the outward facing convex incline feature 635 may force the dynamic braking member toward an outer wall of a raceway.

FIG. 6E depicts a shuttle component 600E including an inward facing convex incline feature 645 on a distal surface. The inward facing nature of the inward facing convex incline feature 645 may force a dynamic braking member toward an inner wall of a raceway.

FIG. 6F depicts a shuttle component 600F including an adjustable incline feature 650. The adjustable incline feature 650 is hingedly coupled to the shuttle component 600F. When a selected incline is configured, a set screw 655 may be tightened to hold the incline in place. In some embodiments, the adjustable incline feature 650 may be user accessible. The inclined features 605, 615, 625, 635, 645, 650 may guide a DBM into a frictional retraction impingement with an inside surface of a circular channel when a cylindrical drum is in a retraction mode.

FIGS. 7A, 7B, 7C, 7D, 7E and 7F depict plan views of various DBM embodiments. Some embodiments may include iron. Iron may advantageously provide wear resistance. Some embodiments may include copper. Copper may be advantageously combined with other metals to provide more softness creating a more friction for a given force. Some embodiments may include ceramic, which may provide an advantageous compromise between durability and loss of friction. In various implementations, the DBM may include rubber. Rubber may provide very high friction for a given force application. Some embodiments may include various synthetic material (e.g., polymers, synthetic rubber, cellulose fibers). Various synthetic materials may provide high friction for a given force application.

Figure 7A:
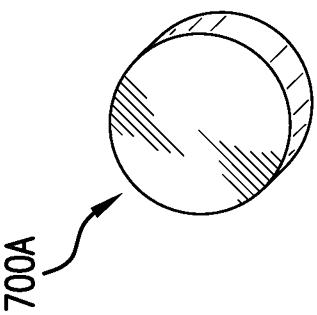
FIGS. 7A, 7B, 7C, 7D, 7E and 7F depict plan views of exemplary DBM embodiments.
Figure 7B:
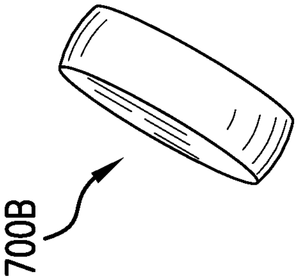
Figure 7C:
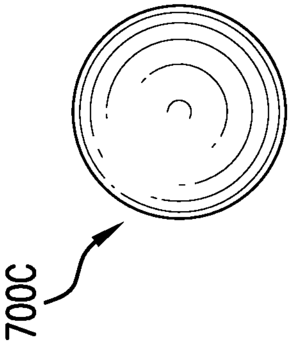
Figure 7D:
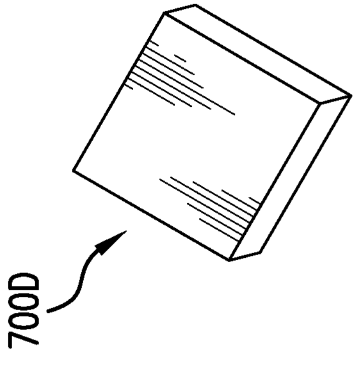
Figure 7E:
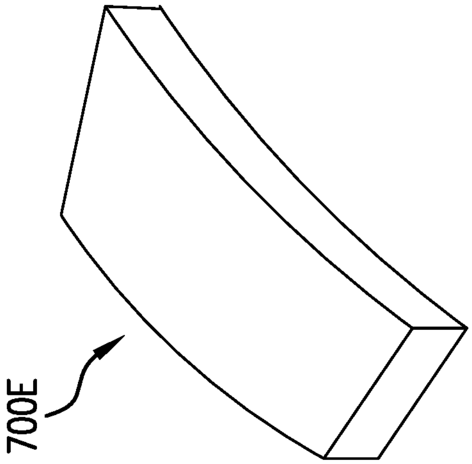

FIG. 7A depicts a DBM component 700A. The DBM component 700A is puck shaped. FIG. 7B depicts a DBM component 700B. The DBM component 700B is a central slice of a sphere. FIG. 7C depicts a DBM component 700C. The DBM component 700C is spherical. FIG. 7D depicts a DBM component 700D. The DBM component 700D is rectangular. FIG. 7E depicts a DBM component 700E. The DBM component 700E is trapezoidal.

Figure 7F:
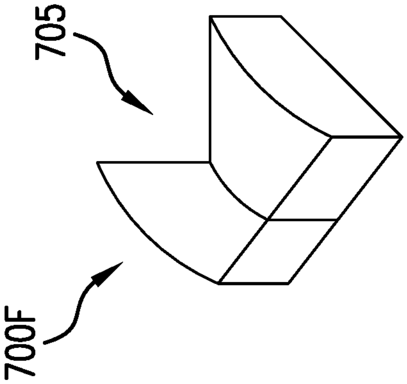

FIG. 7F depicts a DBM component 700F. The DBM component 700F exists as two separate parts. On one end is a V-shaped throat 705. The two separate parts meet on a horizontal surface with respect to the example depiction, intersecting with the center of the V-shaped throat. The DBM component 700F may be used, for example, in combination with the shuttle 600B (FIG. 6B). In operation, the triangular point feature 620 (FIG. 2) may be forced into the V-shaped throat and may produce braking forces on both the inner and outer walls of a raceway. The wear of the DBM component 700F may be even, and the DBM component may advantageously continue to be effective as its surfaces wear down.

Figure 8A:
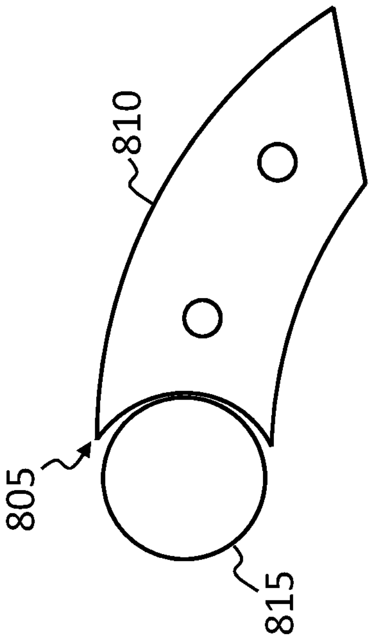
FIGS. 8A and 8B depict plan views of exemplary shuttle embodiments centering a DBM to minimize friction against a channel ring.
Figure 8B:
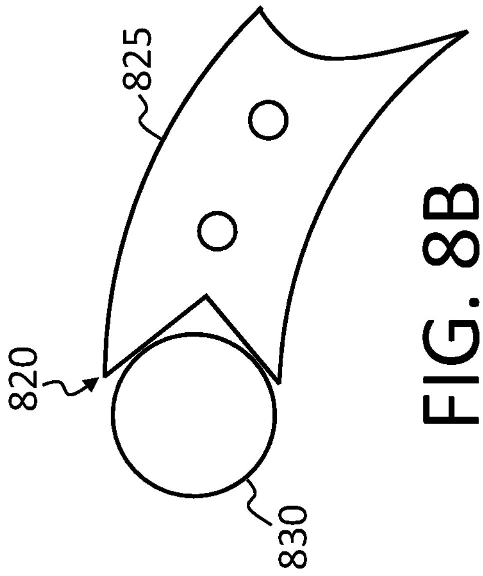

FIGS. 8A and 8B depict plan views of exemplary shuttle embodiments centering a DBM to minimize friction against a channel ring. With reference to FIG. 8A, an extension end 805 of a shuttle 810 is concave. The concave shape of the extension end 805 holds a DBM 815 away from both an inner and outer wall of a channel ring, such as channel ring 405 (FIG. 4). With reference to FIG. 8B, an extension end 820 of a shuttle 825 is V-shaped. The V-shape of the extension end 820 holds a DBM 830 away from both an inner and outer wall of a channel ring, such as channel ring 405 (FIG. 4).

Figure 9:
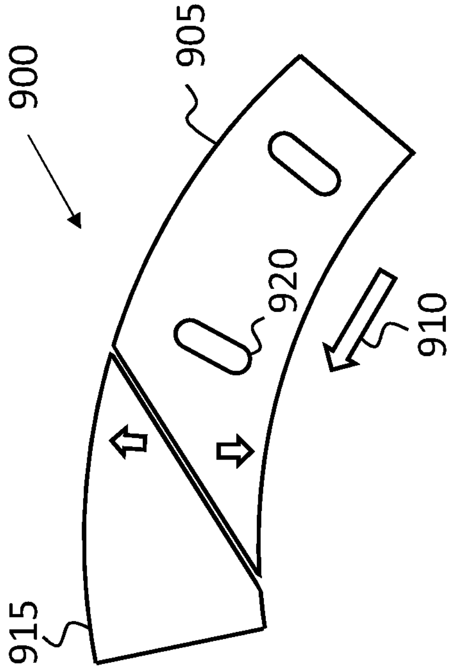
FIG. 9 depicts a plan view of an exemplary shuttle and DBM embodiment, both the shuttle and the DBM providing friction against a channel ring.

FIG. 9 depicts a plan view of an exemplary shuttle and DBM embodiment, both the shuttle and the DBM providing friction against a channel ring. In the depicted example 900, a shuttle 905 in a retraction mode 910 moves counterclockwise. During movement, the shuttle 905 moves a DBM 915. The DBM 915 and the shuttle 905 include complementary ramps which face each other. When in motion, the shuttle 905 and the DBM 915 are forced in opposite directions along a path radius. In the depicted example, the shuttle 905 is forced toward an inner wall of a channel ring, such as channel ring 405 (FIG. 4). The DBM 915 is forced toward an outer wall of the channel ring. The shuttle 905 includes radial coupling slots 920. The slotted shape of the coupling slots 920 may allow the shuttle 905 to move radially with respect to the channel ring while being moved around the channel ring.

Although various embodiments have been described with reference to the figures, other embodiments are possible. For example, a deceleration system may be configured with a railway channel combined with an SRD housing. A drive block may be combined with a drum and may rotate with the drum. A friction pin may move through the railway.

When an SRD cable retracts, the drum may rotate simultaneously with the drive block. The drive block may push the friction pin on the railway. The drum and the cable retraction may slow down in response to a friction force from this deceleration system. When the SRD cable is extracted from the SRD, the deceleration system may not slow down the cable extraction speed.

In an exemplary aspect, a polarized deceleration apparatus may be implemented in a self-retracting device (SRD) in personal protection applications. The apparatus may include a cylindrical drum rotatably coupled to a housing. The drum may be rotatable about a longitudinal axis so as to unspool a tether in an extraction mode and to spool the tether in a retraction mode. The apparatus may include a circular channel fixedly coupled to the housing and in a plane orthogonal to the longitudinal axis. The apparatus may include a shuttle mechanically coupled to rotate in response to the cylindrical drum, the shuttle configured to move within the circular channel. The apparatus may include a dynamic braking member (DBM) configured to move within the circular channel. The shuttle may include a retraction face configured to guide the DBM into a frictional retraction impingement with an inside surface of the circular channel when the cylindrical drum is in the retraction mode. The shuttle may include an extraction face configured to guide the DBM around the circular channel when the cylindrical drum is in an extraction mode.

The extraction face of the shuttle may be substantially parallel with a radius of the circular channel. The retraction face of the shuttle may include a substantially linear slope. In some examples, the retraction face of the shuttle may be concave. In various examples, the retraction face of the shuttle may be convex. In some embodiments, the retraction face of the shuttle may be hyperbolic. In some examples, the retraction face of the shuttle may be piecewise linear. In various examples, the retraction face of the shuttle may be complementary to at least one face of the DBM. The DBM may be substantially cylindrical. In operation, a frictional extraction force associated with the extraction mode may be less than a frictional retraction force associated with the retraction mode.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A polarized deceleration apparatus for use in a self-retracting device (SRD) in personal protection applications, the polarized deceleration apparatus comprising:

a cylindrical drum rotatably coupled to a housing, the cylindrical drum rotatable about a longitudinal axis so as to unspool a tether in an extraction mode and to spool the tether in a retraction mode;

a circular channel fixedly coupled to the housing and disposed in a plane orthogonal to the longitudinal axis, wherein the circular channel is ring-shaped and has an inner wall and an outer wall;

a shuttle mechanically coupled to the cylindrical drum, the shuttle configured to move within the confines of the inner wall and the outer wall of the ring-shaped circular channel when the cylindrical drum rotates; and a dynamic braking member (DBM) configured to move within the confines of the inner wall and the outer wall of the ring-shaped circular channel;

wherein the shuttle further comprises a retraction face configured to guide the DBM into a frictional retraction impingement with an inside surface of the circular channel when the cylindrical drum is in the retraction mode, and wherein the shuttle further comprises an extraction face configured to guide the DBM around the circular channel when the cylindrical drum is in an extraction mode.

2. The polarized deceleration apparatus of claim 1, wherein the extraction face of the shuttle is substantially parallel with a radius of the circular channel.

3. The polarized deceleration apparatus of claim 1, wherein the retraction face of the shuttle comprises a substantially linear slope.

4. The polarized deceleration apparatus of claim 1, wherein the retraction face of the shuttle is concave.

5. The polarized deceleration apparatus of claim 1, wherein the retraction face of the shuttle is convex.

6. The polarized deceleration apparatus of claim 1, wherein the retraction face of the shuttle is hyperbolic.

7. The polarized deceleration apparatus of claim 1, wherein the retraction face of the shuttle is piecewise linear.

8. The polarized deceleration apparatus of claim 1, wherein the retraction face of the shuttle is complementary to at least one face of the DBM.

9. The polarized deceleration apparatus of claim 1, wherein the DBM is substantially cylindrical.

10. The polarized deceleration apparatus of claim 1, wherein a frictional extraction force associated with the extraction mode is less than a frictional retraction force associated with the retraction mode.

11. A polarized deceleration apparatus for use in a self-retracting device (SRD) in personal protection applications, the polarized deceleration apparatus comprising:

a cylindrical drum rotatably coupled to a housing, the cylindrical drum rotatable about a longitudinal axis so as to unspool a tether in an extraction mode and to spool the tether in a retraction mode;

a circular channel fixedly coupled to the housing and disposed in a plane orthogonal to the longitudinal axis, wherein the circular channel is ring-shaped and has an inner wall and an outer wall;

a shuttle mechanically coupled to rotate in response to the cylindrical drum, the shuttle configured to move within the confines of the inner wall and the outer wall of the ring-shaped circular channel when the cylindrical drum rotates; and a dynamic braking member (DBM) configured to move within the confines of the inner wall and the outer wall of the ring-shaped circular channel, wherein the shuttle further comprises a retraction face configured to guide the DBM into a frictional retraction impingement with an inside surface of the circular channel when the cylindrical drum is in the retraction mode.

12. The polarized deceleration apparatus of claim 11, wherein the retraction face of the shuttle comprises a substantially linear slope.

13. The polarized deceleration apparatus of claim 11, wherein the retraction face of the shuttle is concave.

14. The polarized deceleration apparatus of claim 11, wherein the retraction face of the shuttle is complementary to at least one face of the DBM.

15. The polarized deceleration apparatus of claim 11, wherein the DBM is substantially cylindrical.

16. The polarized deceleration apparatus of claim 11, wherein the shuttle further comprises an extraction face, wherein in the extraction mode, the extraction face of the shuttle is configured to guide the DBM around the circular channel, and wherein a frictional extraction force associated with the extraction mode is less than a frictional retraction force associated with the retraction mode.

17. A polarized deceleration apparatus for use in a self-retracting device (SRD) in personal protection applications, the polarized deceleration apparatus comprising:

a cylindrical drum rotatably coupled to a housing, the cylindrical drum rotatable about a longitudinal axis so as to unspool a tether in an extraction mode and to spool the tether in a retraction mode;

a circular channel fixedly coupled to the housing and disposed in a plane orthogonal to the longitudinal axis, wherein the circular channel is ring-shaped and has an inner wall and an outer wall;

a shuttle mechanically coupled to rotate in response to the cylindrical drum, the shuttle configured to move within the confines of the inner wall and the outer wall of the ring-shaped circular channel when the cylindrical drum rotates; and a dynamic braking member (DBM) configured to move within the confines of the inner wall and the outer wall of the ring-shaped circular channel, wherein the shuttle further comprises means for guiding the DBM into a frictional retraction impingement with an inside surface of the circular channel when the cylindrical drum is in the retraction mode.

18. The polarized deceleration apparatus of claim 17, wherein the shuttle further comprises an extraction face substantially parallel with a radius of the circular channel.

19. The polarized deceleration apparatus of claim 17, wherein the DBM is substantially cylindrical.

20. The polarized deceleration apparatus of claim 17, wherein the shuttle further comprises an extraction face, wherein in the extraction mode, the extraction face of the shuttle is configured to guide the DBM around the circular channel, and wherein a frictional extraction force associated with the extraction mode is less than a frictional retraction force associated with the retraction mode.

* * * * *